US009649585B2

(12) United States Patent
Steins et al.

(10) Patent No.: US 9,649,585 B2
(45) Date of Patent: May 16, 2017

(54) FILTER SYSTEM WITH SENSOR SOCKET

(71) Applicant: MANN+HUMMEL GMBH, Ludwigsburg (DE)

(72) Inventors: Oliver Steins, Roemerberg (DE); Klaus-Dieter Ruhland, Meckenheim (DE); Michael Kaufmann, Meckenheim (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 120 days.

(21) Appl. No.: 14/474,416

(22) Filed: Sep. 2, 2014

(65) Prior Publication Data

US 2015/0059584 A1 Mar. 5, 2015

Related U.S. Application Data

(60) Provisional application No. 62/038,312, filed on Aug. 17, 2014, provisional application No. 62/038,575, (Continued)

(30) Foreign Application Priority Data

Sep. 2, 2013 (DE) .................. 10 2013 014 488
Sep. 2, 2013 (DE) .................. 10 2013 014 489
(Continued)

(51) Int. Cl.
*B01D 46/00* (2006.01)
*B01D 46/52* (2006.01)
(Continued)

(52) U.S. Cl.
CPC ..... *B01D 46/0086* (2013.01); *B01D 46/0001* (2013.01); *B01D 46/0002* (2013.01);
(Continued)

(58) Field of Classification Search
CPC ............ B01D 46/0002; B01D 46/0004; B01D 46/0086; B01D 46/2411; B01D 46/2414; F02M 35/09
See application file for complete search history.

(56) References Cited

U.S. PATENT DOCUMENTS 6,183,544 B1 * 2/2001 Ormond ............. B01D 46/2411
55/310
6,383,243 B1 * 5/2002 Yoder .................. B01D 46/446
116/268
(Continued)

FOREIGN PATENT DOCUMENTS

EP 0976932 A2 2/2000
GB 2479810 A 10/2011
WO 2014084959 A1 6/2014

*Primary Examiner* — Robert Clemente
(74) *Attorney, Agent, or Firm* — James Hasselbeck

(57) ABSTRACT

A filter system has a housing with a housing wall and at least one lid. An inlet socket is arranged at the housing and feeds a fluid to be filtered into the housing. An outlet socket is arranged at the housing and discharges the fluid that has been filtered from the housing. A sensor socket is arranged at an end section of the housing. The sensor socket is arranged angularly relative to a longitudinal axis of the housing at the outlet socket.

12 Claims, 7 Drawing Sheets

Related U.S. Application Data filed on Aug. 18, 2014, provisional application No. 62/038,601, filed on Aug. 18, 2014, provisional application No. 62/038,920, filed on Aug. 19, 2014, provisional application No. 62/038,672, filed on Aug. 18, 2014, provisional application No. 62/038,869, filed on Aug. 19, 2014.

(30) Foreign Application Priority Data

| Sep. 2, 2013 | (DE) | ......................... 10 2013 014 491 |
|---|---|---|
| Sep. 2, 2013 | (DE) | ......................... 10 2013 014 492 |
| Sep. 2, 2013 | (DE) | ......................... 10 2013 014 493 |
| Sep. 2, 2013 | (DE) | ......................... 10 2013 014 507 |

(51) Int. Cl.

| *F02M 35/024* | (2006.01) |
|---|---|
| *F02M 35/02* | (2006.01) |
| *F02M 35/022* | (2006.01) |
| *F02M 35/09* | (2006.01) |
| *B01D 46/24* | (2006.01) |

(52) U.S. Cl.
CPC ..... *B01D 46/0004* (2013.01); *B01D 46/0005* (2013.01); *B01D 46/0021* (2013.01); *B01D 46/0027* (2013.01); *B01D 46/0046* (2013.01); *B01D 46/2411* (2013.01); *B01D 46/2414* (2013.01); *B01D 46/521* (2013.01); *B01D 46/522* (2013.01); *F02M 35/0203* (2013.01); *F02M 35/024* (2013.01); *F02M 35/0216* (2013.01); *F02M 35/0223* (2013.01); *F02M 35/02416* (2013.01); *F02M 35/02483* (2013.01); *F02M 35/09* (2013.01); *B01D 2265/06* (2013.01); *Y10T 29/49826* (2015.01)

(56) References Cited

U.S. PATENT DOCUMENTS

| 2004/0065206 | A1* | 4/2004 | Walker, Jr. | ......... | B01D 46/0086 96/381 |
|---|---|---|---|---|---|
| 2004/0134171 | A1* | 7/2004 | Scott | .................. | B01D 46/0001 55/482 |
| 2005/0193695 | A1* | 9/2005 | Holmes | .............. | B01D 46/0002 55/482 |
| 2006/0086075 | A1* | 4/2006 | Scott | .................. | B01D 46/0001 55/498 |
| 2007/0160510 | A1 | 7/2007 | Schultz et al. | | |
| 2008/0276583 | A1* | 11/2008 | Munkel | .............. | B01D 46/0004 55/498 |
| 2014/0102060 | A1* | 4/2014 | Kato | .................. | B01D 46/0005 55/502 |

\* cited by examiner

FILTER SYSTEM WITH SENSOR SOCKET

CROSS-REFERENCE TO RELATED APPLICATIONS

This application claims the benefit of German patent application Nos. 10 2013 014 488.4, filed Sep. 2, 2013; 10 2013 014 489.2, filed Sep. 2, 2013; 10 2013 014 507.4, filed Sep. 2, 2013; 10 2013 014 492.2, filed Sep. 2, 2013; 10 2013 014 491.4, filed Sep. 2, 2013; and 10 2013 014 493.0, filed Sep. 2, 2013. The entire contents of the aforesaid German patent applications being incorporated herein by reference and to the fullest extent of the law.

This application claims the benefit of U.S. provisional patent application Nos. 62/038,312, filed: Aug. 17, 2014; 62/038,575, filed: Aug. 18, 2014; 62/038,601, filed: Aug. 18, 2014; 62/038,920, filed: Aug. 19, 2014; 62/038,672, filed: Aug. 18, 2014 and 62/038,869, filed Aug. 19, 2014. The entire contents of the aforesaid provisional patent applications being incorporated herein by reference and to the fullest extent of the law.

BACKGROUND OF THE INVENTION

The invention relates to a filter system with a sensor socket, particularly for use as air filter of an internal combustion engine.

Air filter systems are known from DE102009033261A and from EP1835166A, where connection extensions for maintenance indicators, such as a maintenance interval display, for example, are mounted to a clean air outlet, from which they extend orthogonally. In DE102009033261A, the outlet is firmly mounted to a filter housing, whereas in EP1835166A, the outlet is pivotably mounted in the filter housing. In doing so, the connection extension can be rotated into a suitable position for maintenance indicators in order to mount a sleeve to be connected thereto or a sensor in a favorable position for the assembly situation on an internal combustion engine, for example. In both cases, a sensor or sleeve mounted at the connection extension extends far beyond the contour of the housing of the air filter system, due to the orthogonal arrangement of the connection extension. This requires additional installation space, on the one hand, and involves the risk of damage to the sensor, on the other hand.

One object of the invention is therefore to create a compact filter system with a sensor socket, wherein the sensor socket is accommodated largely without damage.

SUMMARY OF THE INVENTION

The above objects are solved according to one aspect of the invention by means of a filter system which provides a sensor socket arranged at the housing, wherein the sensor socket is arranged angularly relative to a longitudinal axis of the housing in an end section of the housing.

Favorable embodiments and advantages of the invention result from the further claims, the description and the drawing.

A filter system is suggested, wherein the filter system comprises a housing with housing wall and at least one lid, an inlet socket arranged at the housing for feeding of a fluid to be filtered, particularly air, an outlet socket arranged at the housing for discharging the filtered fluid as well as a sensor socket arranged at the housing. In this way, the sensor socket is arranged angularly relative to a longitudinal axis of the housing in an end section of the housing.

The arrangement of a sensor socket according to the invention for connecting maintenance indicators, for example, presents a particularly favorable solution with respect to installation space and is therefore of importance particularly for the installation of filter systems in internal combustion engines in the automobile sector where installation space is typically very limited. Particularly for small circular air filter housings, the sensor connection interface, most often a connection thread, of a sensor socket cannot be recessed in a type of depression at the housing, for a merely radial arrangement of the connection extension. As a result, a screwed-in maintenance indicator would completely protrude beyond the housing diameter. The claimed installation space would thus have a very large diameter, on the one hand. On the other hand, there would also be the danger of the sensor socket with the maintenance indicator being easily damaged during installation due to its protruding position. The angular arrangement according to the invention allows for a maintenance indicator being substantially accommodated within the contour of the filter system so that the installation space is well utilized and the sensor socket does not protruded excessively. Still, sensors or connection elements can be easily attached, particularly screwed in.

An angular arrangement also enables better protection against possible damage of a maintenance indicator already screwed onto the sensor socket during handling and/or transport of the filter system with respect to logistics and/or assembly by the customer. The required installation space in the radial direction is less as well. With respect to a solution where the sensor socket would sit radially on the outlet socket, the angular arrangement has an advantage regarding installation space in the axial direction, because the length of the outlet socket relative to the beginning of an assembly surface, for example, at an internal combustion engine, can be kept smaller.

With respect to an axial connection solution at a front face of the housing, the angular arrangement has the advantage that more installation space is available between a maintenance indicator mounted on the sensor socket and the outlet socket, which is used, for example, to mount a rubber sleeve with clamp for airflow.

The sensor socket advantageously comprises a connection channel as well as a connection interface arranged at the outside of the filter housing. At the interface, the connection channel ends and a maintenance indicator, or a connection cable to such indicator, can be mounted. Advantageously, a threaded connection or a bayonet connection is used to do so.

The sensor socket can be advantageously arranged adjacent to the outlet socket which is typically part of the housing wall. In doing so, it is possible to exactly measure a pressure loss based on the loading of the filter system by means of contamination particles because the pressure can be determined directly in the outlet channel.

The sensor socket can be arranged, particularly advantageously, at the bottom of the outlet socket. Here, the attachment of a maintenance indicator can determine the applicable pressure for the maintenance interval display directly, and when attaching the sensor socket at such location, the installation space of the housing of the filter system can be favorably utilized, on the other hand.

In one suitable embodiment, the sensor socket can be arranged at a front face of the housing. When attaching the sensor socket in this area, the pressure to be determined can be measured in proximate vicinity of the outlet. Further, it is possible that a mounted sensor or a maintenance indicator does not protrude radially beyond the circumference of the housing.

The sensor socket can be advantageously arranged at an angle of between 10° and 80°, preferably between 20° and 70°, particularly preferred between 30° and 60°, with respect to the front face of the housing. Such an angle allows a favorable assembly position for screwing on or fitting of a sensor, a sensor plug or a maintenance indicator. In this way, a distance between the mounted sensor and the outlet socket of at least 10 millimeters can be kept for typical maintenance interval display components, which is generally considered as sufficient for vibration stressed systems in the automobile sector.

In one alternative embodiment, the sensor socket can be arranged directly at the outlet socket. The outlet socket as part of the housing wall is a favorable mounting location for the sensor socket, because, in this way, the pressure determining a maintenance indicator can be measured directly in the outlet channel.

The outlet socket can be advantageously arranged concentrically with respect to the longitudinal axis and the sensor socket can be laterally offset with respect to the longitudinal axis. For circular filter housings it is common to mount the outlet socket in a symmetrical arrangement concentrically with respect to the longitudinal axis. In doing so, the sensor socket can be arranged radially in the direction of the longitudinal axis for an angular arrangement, but it can also be arranged laterally offset thereto if the installation space can be utilized more favorably in this way.

Such arrangement can also mean that the sensor socket is arranged in a wall of the outlet socket laterally offset with respect to an axis of the outlet socket. Such arrangement facilitates the arrangement of the sensor socket directly in the wall of the outlet socket, however not symmetrically with respect to an axis of the outlet socket but laterally offset thereto. Such an arrangement can also be favorable for reasons of installation space and still allow determination of the determining pressure for a maintenance indicator directly in the outlet channel.

A connection channel of the sensor socket can advantageously open into a clean side of the filter system. If the sensor socket is arranged closely adjacent to the outlet socket, that is, for example, directly at the outlet socket or the bottom of the outlet socket, the connection channel of the sensor socket can open directly into the outlet channel and thus into the clean side, i.e., the area where the filtered fluid flows, and thus provide favorable measurement values for a maintenance indicator.

Expediently, the sensor socket can be implemented with the housing in one piece and advantageously integrally connected. In doing so, the sensor socket can be provided and manufactured in one manufacturing process, for example by means of plastics injection molding, so that no additional assembly or sealing of the sensor socket is required for the housing of the filter system. Further preferred, the outlet socket of the housing, in the proximity of which the sensor socket is advantageously arranged, is also implemented in one piece and preferably integrally connected with the housing.

In a preferred embodiment the sensor socket is arranged in an extension of the housing, which extends radially outside of the outlet socket in axial direction from the front face of the housing at the outlet side thereof, wherein the connection channel extends bore-like within the extension. The extension is further preferably implemented in the shape of a rib, which extends radially to the outside as viewed from the outlet socket. In doing so, the rib is preferably implemented so as to rise outwardly, starting from the outlet socket, relative to the front face of the housing, particularly along the extension channel. Thus, the connection channel and the sensor socket can be integrated into a structural element, such as the rib, which supports the housing in the area of the filter element receptacle. This is also advantageous during manufacturing of the housing if it is manufactured by means of plastics injection molding because only a single slider—pivotable, if applicable—is required for the introducing the connection interface and the connection channel, and the connection channel can still begin, optimal for pressure measurement, at the bottom of the outlet socket, i.e. the beginning of the outlet socket starting from the front face of the filter housing interior. The integration into the preferred rib-shaped extension facilitates a particularly stable sensor socket, which can well receive and divert shear and bending stress applied to the connection interface, for example by means of outer force effects on a connected maintenance indicator, pressure sensor or the like.

BRIEF DESCRIPTION OF THE DRAWINGS

Further advantages result from the following description of the drawings. Embodiments of the invention are depicted in the drawings. The drawings, the description and the claims contain numerous features in combination. Expediently, the person skilled in the art will consider the features separately, as well, and combine them to useful further combinations.

DESCRIPTION OF PREFERRED EMBODIMENTS

In the Figures, same or similar components are identified with same reference signs. The Figures only show examples and are not to be understood to be limiting.

Figure 1:
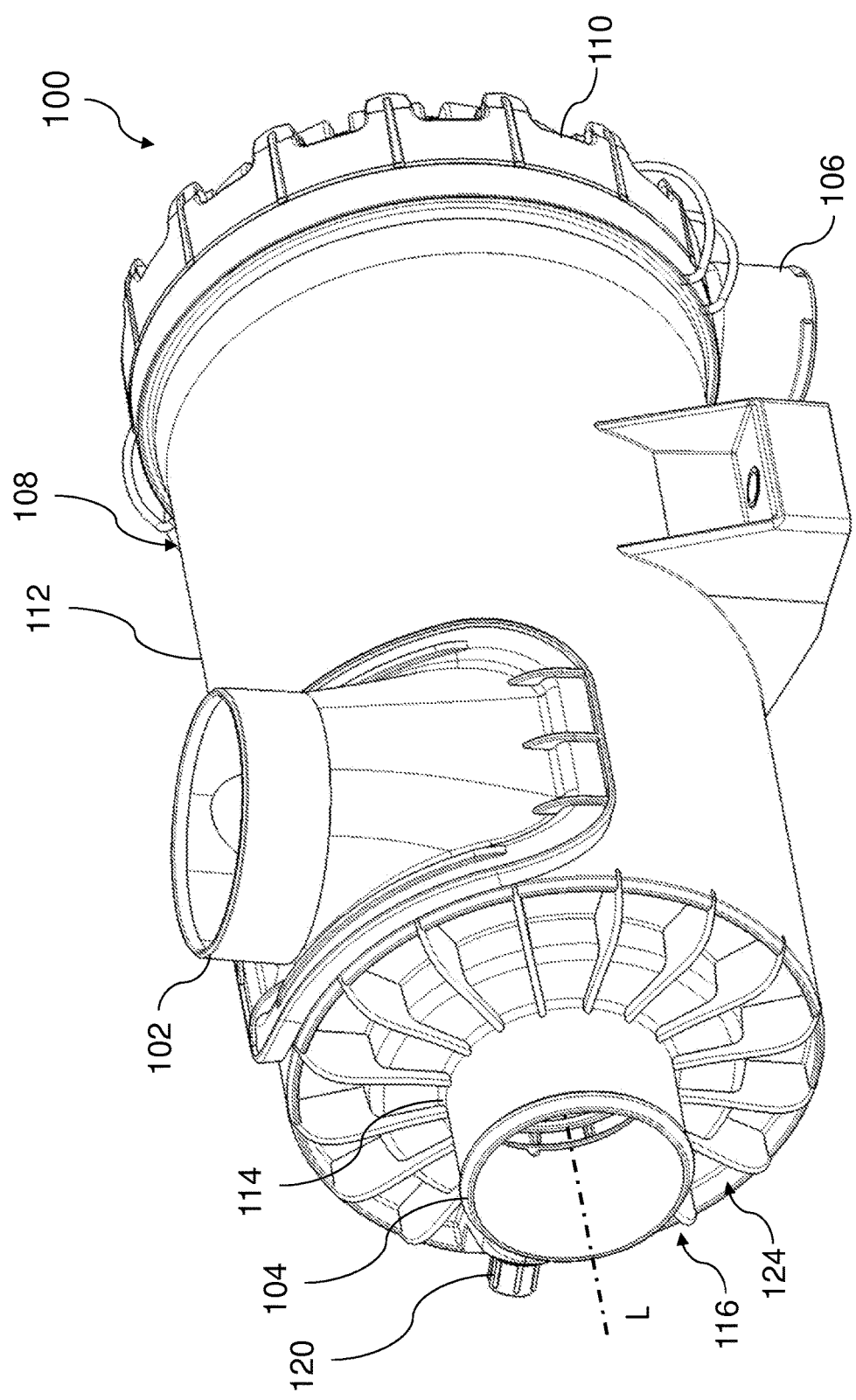
FIG. 1 shows an exemplary perspective view of a two-stage filter system with a cyclone separator according to one exemplary embodiment of the invention, depicted from the side of the outlet socket.

FIG. 1 shows a perspective view of a two-stage filter system 100 with a cyclone separator 36 according to one exemplary embodiment of the invention, depicted from the side of the outlet socket, with tangential inlet 102, centric outlet 104 at a front face of the housing, and bottom side contamination outlet 106. A circular filter configuration is depicted, which is composed of a housing 108 having a housing wall 112, and is closed with a lid 110, for example, with threaded coupling or bayonet catch or snap clasp. For use as air filter system, dust-laden air flows into the inlet 102 that is arranged tangentially with respect to the air filter element mounted inside so that the air in the interior of housing 108 is caused to rotate by means of a flow protection means at the filter element. The filter element and flow protection means are not depicted in the drawing. By means of the cyclone effect caused by the rotational movement of the air, centrifugal forces operate on the dust particles of the flowing air so that the dust particles will be partially deposited at the housing wall and discharged from the filter system 100 via the contamination outlet 106. In doing so, the filter element is stressed less and the service life of the filter element is increased. The purified air can be discharged via the centric outlet 104 from the housing 108.

Such filter systems, as depicted in FIG. 1, are commonly utilized as air and/or particle filters, particularly for internal combustion engines in construction machines and agricultural machines. They are characterized by significant robustness and have a short service life due to the high filter load. In doing so, a filter system 100 with loaded filter element has to tolerate a weight increase of 10 kg or more.

FIG. 1 further shows a sensor socket 120 arranged at a front face 124 of a housing 108. The sensor socket 120 is arranged angularly with respect to a longitudinal axis L of housing 108 in an end section 116 of housing 108, at a front face 124 in the depicted exemplary embodiment. Such a sensor socket 120 can be utilized for connecting a sensor as maintenance indicator or as maintenance interval display.

Figure 2:
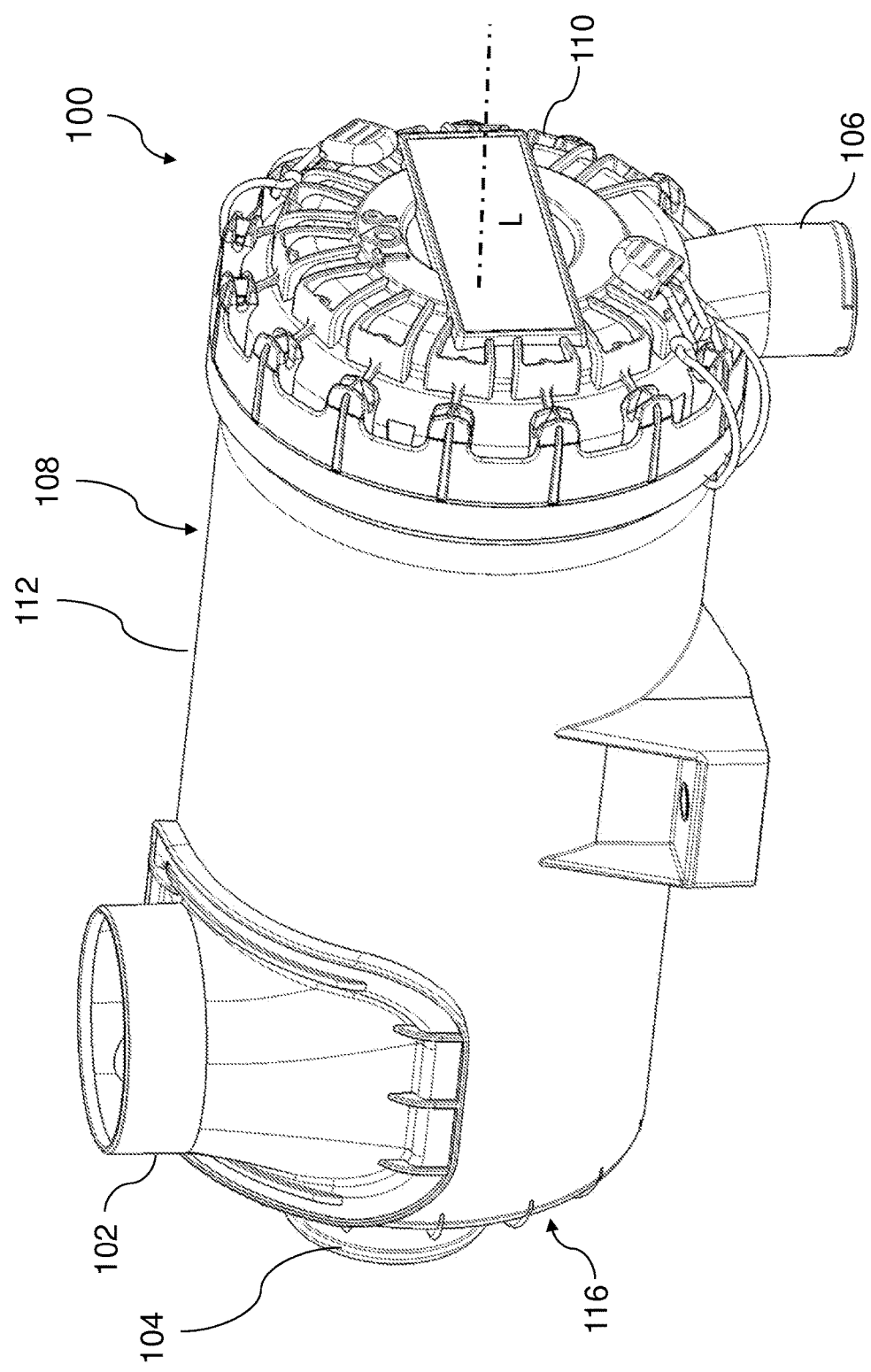
FIG. 2 shows an exemplary perspective view of the filter system of FIG. 1, depicted from the side of the lid.

FIG. 2 shows a perspective view of the filter system 100 of FIG. 1, depicted from the lid side. In the end section 116 of the filter system 100, the outlet socket 104 can be identified as well as the tangential inlet socket 102. Housing 108 with its housing wall 112 is closed at the other end of the filter system 100 by means of the lid 110, which can be opened, having the contamination outlet 106 for discharging the larger dust particles deposited via the cyclone effect.

Figure 3:
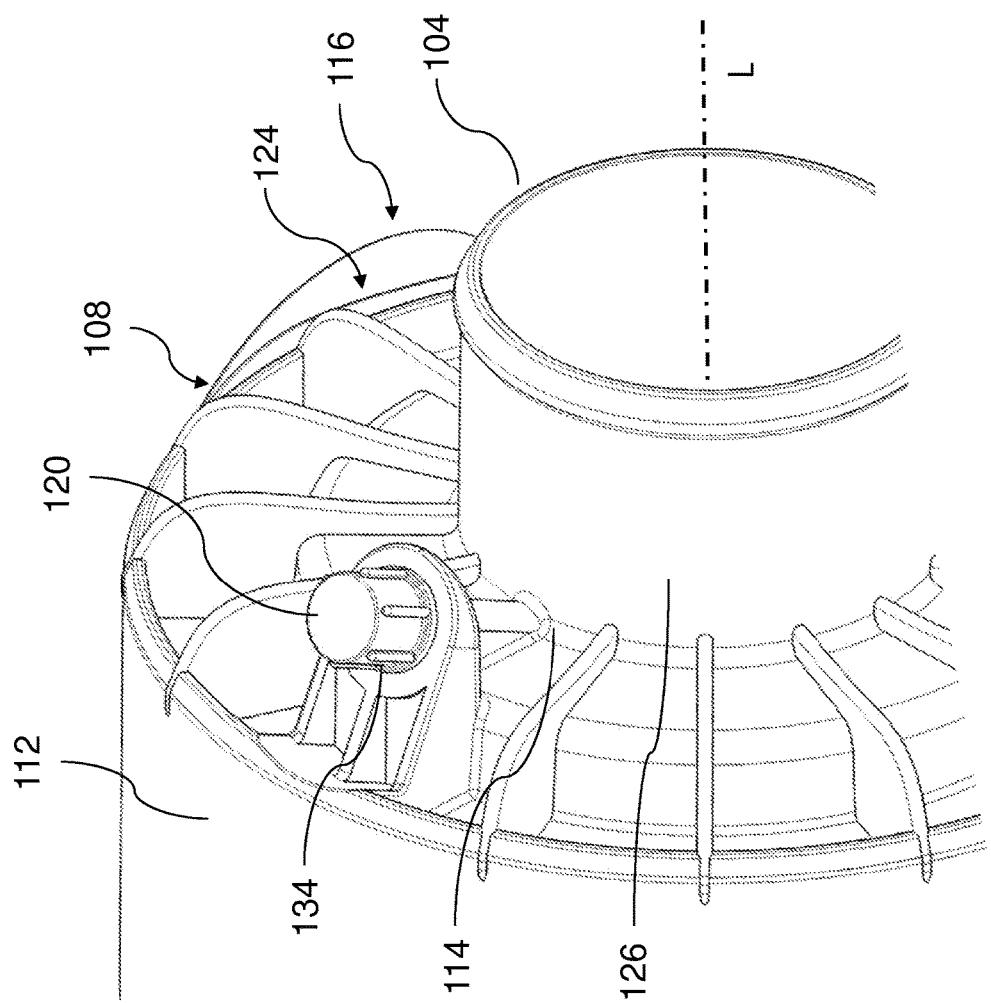
FIG. 3 shows an exemplary detailed view of the filter system of FIG. 1, with view of the sensor socket.

FIG. 3 depicts a detail view of the filter system 100 of FIG. 1 looking onto the sensor socket 120. Outlet socket 104 is arranged concentrically with respect to the longitudinal axis L of housing 108 in the end section 116 of housing 108 at the front face 124. Sensor socket 120, arranged adjacently to the outlet socket 104, extends angularly into the housing 108 in the area between the front face 124 and the outlet socket 104 and opens into the wall 126 of the outlet socket 104 at its bottom 114. At the end of sensor socket 120, a connecting thread 134 is integrated for connecting a sensor or maintenance indicator. Sensor socket 120 can be implemented particularly favorable with a housing 108 in one piece (monolithic), so that it can be manufactured with housing 108 in one working step. For example, the sensor socket 120 can be molded to housing 108.

Figure 4:
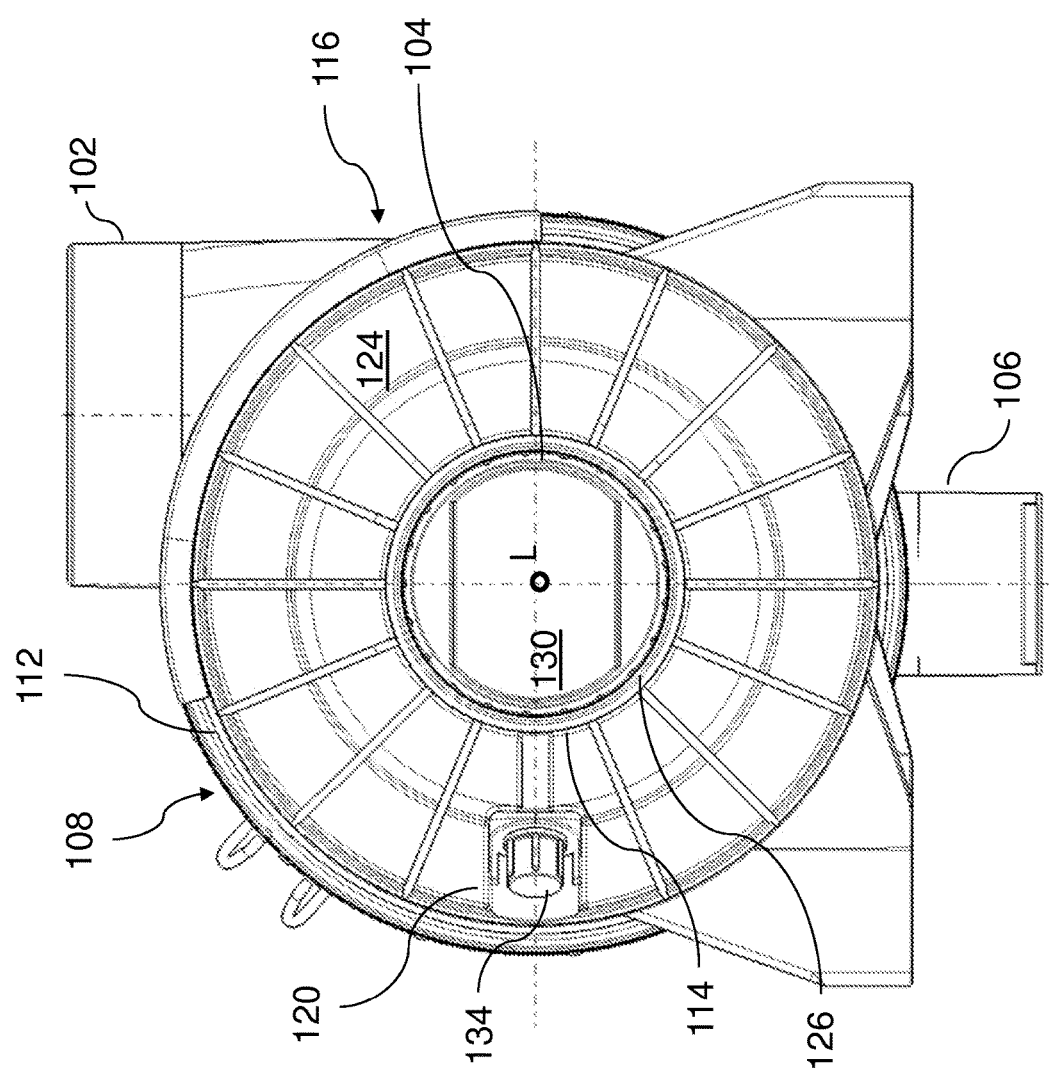
FIG. 4 shows an exemplary view onto the front face of the filter system of FIG. 1.

FIG. 4 depicts a view onto the front face 124 of the filter system 100 of FIG. 1. In this representation, the radial arrangement of the sensor socket 120 can be seen, viewed in the direction of longitudinal axis L. The sensor socket 120 passes into the wall of the outlet socket 104 at the bottom 114 of the outlet socket 104, and thus into the clean side 130 of the filter system 100.

Figure 5:
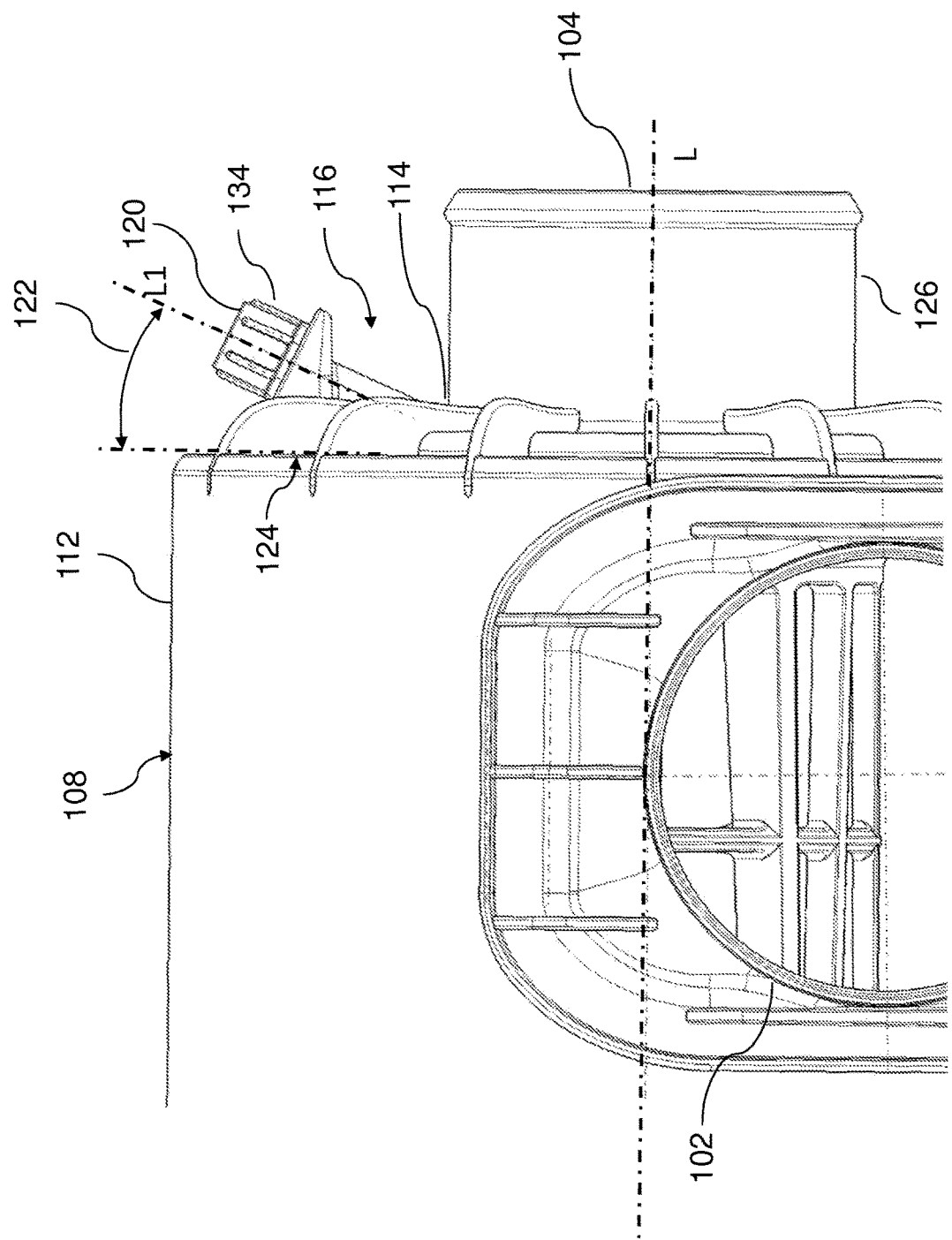
FIG. 5 shows an exemplary side view of the filter system of FIG. 1.

FIG. 5 shows a side view of the filter system 100 of FIG. 1 looking onto the sensor socket 120. The sensor socket 120 is arranged angularly at an angle 122 between 10° and 80°, preferably between 20° and 70°, particularly preferred between 30° and 60°, with respect to the front face of housing 124. This angle 122 is defined between an axis L1 of sensor socket 120 and the front face of housing 124. This arrangement provides sufficient space for mounting a sensor, maintenance indicator, sleeve to a low-pressure switch or a plug between the front face of the housing 124 and the outlet socket 104.

Figure 6:
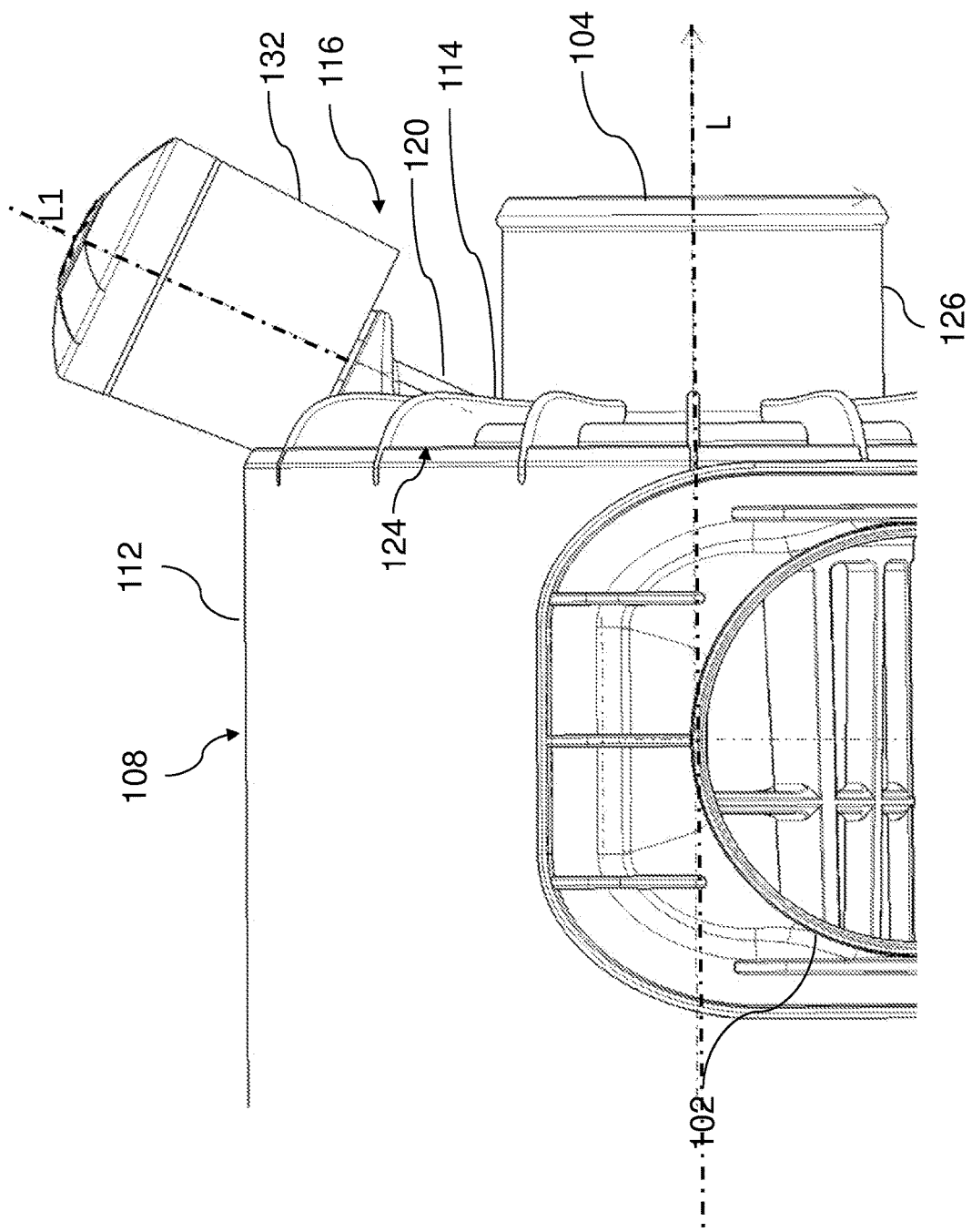
FIG. 6 shows an exemplary side view of the filter system of FIG. 1, with view onto the sensor socket with mounted maintenance indicator.

FIG. 6 shows a side view of the filter system 100 of FIG. 1 looking onto the sensor socket 120 with mounted maintenance indicator 132. The maintenance indicator 132 does in fact extend beyond the circumference of housing 108 of the filter system 100 in the depicted exemplary embodiment; however, it substantially abuts a plane which is defined by the upper rim of the outlet socket 104. This means that the maintenance indicator hardly affects the installation space of an assembly surface for the filter system 100 and can thus be arranged favorably at the filter system 100 with respect to installation space.

Figure 7:
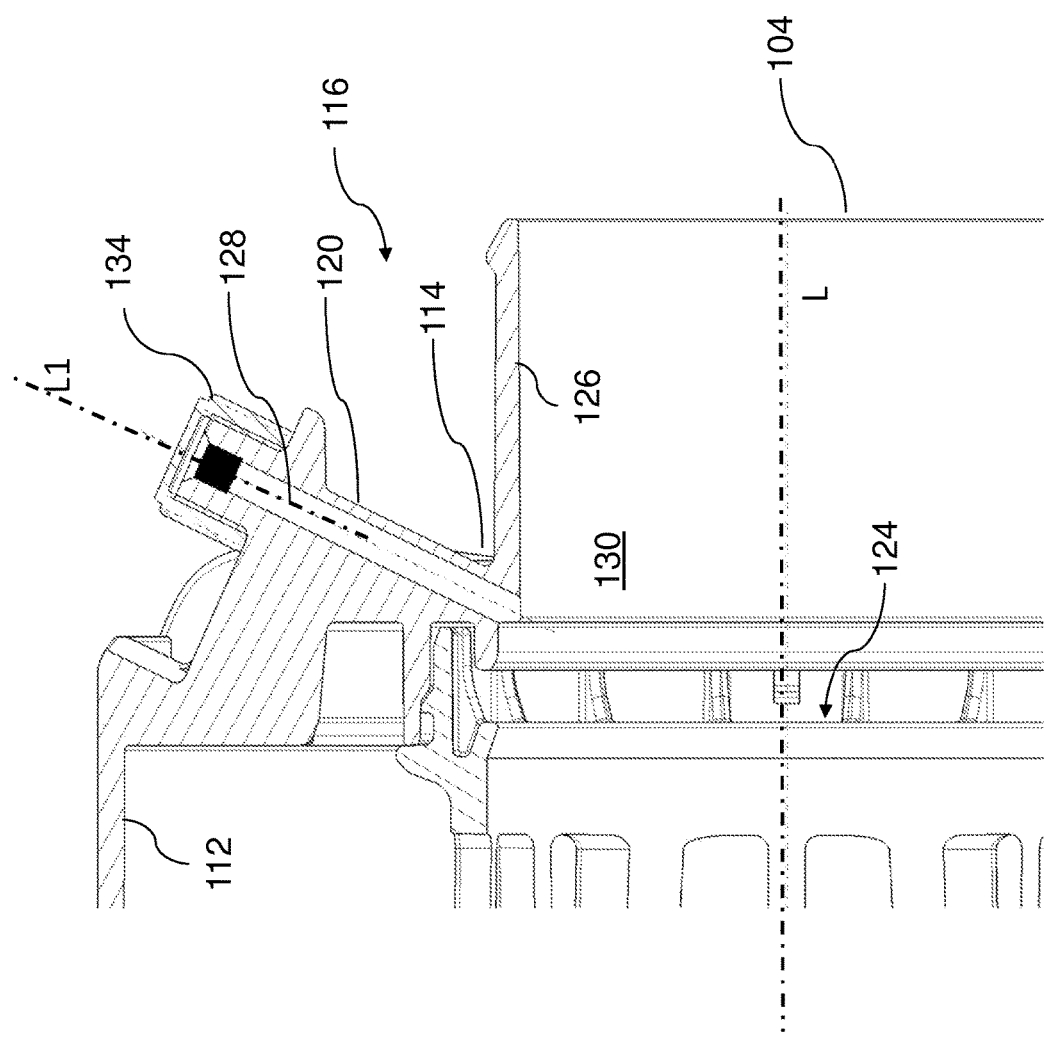
FIG. 7 shows an exemplary longitudinal section through the filter system of FIG. 1, with section through the sensor socket.

FIG. 7 depicts a longitudinal section through the filter system 100 of FIG. 1 with section through the sensor socket 120. It can be discerned in FIG. 7 that the connection channel 128 thus passes into the bottom 114 of the outlet socket 104 so that the pressure to be measured for determining a point in time for a maintenance interval can thus be directly measured at the clean side 130 of the filter system 100. Further, it is discernible that the sensor socket 120 is arranged in an extension of the housing, which extends radially outside of the outlet socket 104 at the outlet side end of the housing 108 in axial direction from the front face side 124 of the housing; the connection channel 128 extends bore-like within the extension. The extension is thus implemented preferably in the shape of a rib which extends radially to the outside, as viewed from the outlet socket 104. The rib is thus implemented, as preferred, so as to extend from the outlet socket 104 relative to the front face of the housing, particularly outwardly rising along the connection channel 128. Thus, connection channel 128 is integrated into the rib in a space saving manner.

In alternative embodiments (not depicted) the sensor socket 120 can be arranged directly at the outlet socket 104. It is also conceivable that the outlet socket 104 is arranged concentrically with respect to the longitudinal axis L and that sensor socket 120 is arranged laterally offset with respect to the longitudinal axis L or that sensor socket 120 is arranged in a wall 126 of the outlet socket 104 laterally offset with respect to an axis of the outlet socket 104. Such embodiments can be advantageous for specific installation space conditions. Particularly for the installation of filter systems 100 in an internal combustion engine in tight installation spaces of automobiles, it can be favorable to also chose non-symmetrical arrangement positions for the sensor socket 120.

While specific embodiments of the invention have been shown and described in detail to illustrate the inventive principles, it will be understood that the invention may be embodied otherwise without departing from such principles.

What is claimed is:

1. A filter system comprising:
   a housing comprising:
   a circumferential outer wall circumferentially surrounding a longitudinal axis (L) and extending axially relative to the longitudinal axis;
   wherein radial, as used herein, is a direction traverses to the longitudinal axis;
   a housing end section as a wall formed on a first axial end of the circumferential outer wall and closing over a front face of the circumferential outer wall of the housing at the first axial end, the housing end section forming an outlet socket extending axially outwardly from the housing end section and a sensor socket;
   wherein the housing end section, housing circumferential outer wall and sensor socket are formed together as a single, one-piece molded, monolithic housing;

wherein the outlet socket has:
   a bottom end arranged proximate to the front face of the circumferential outer wall of the housing; and
   an opposing connection end arranged axially outward away from the front face of the circumferential outer wall of the housing;
wherein the sensor socket has:
   a connection channel formed within the sensor socket, the connection channel having:
      a first end arranged at the bottom of the outlet socket and opening into a clean side of the filter system; and
      an opposing sensor connection end arranged radially outwardly from and axially outwardly from the first end of the connection channel such that the sensor socket is arranged angularly relative to a longitudinal axis of the housing;
   a connection interface arranged on the sensor socket at the sensor connection end of the connection channel;
at least one lid;
wherein the inlet socket is adapted to feed a fluid to be filtered into the housing;
wherein the outlet socket is adapted to discharge the fluid that has been filtered from the housing;
wherein the sensor socket does not protrude radially outwardly beyond the circumferential outer wall of the housing.

2. The filter system according to claim 1, wherein the sensor socket is arranged adjacent to the outlet socket.

3. The filter system according to claim 1, wherein the sensor socket is arranged at an angle of between 10° and 80° relative to the front face of the housing.

4. The filter system according to claim 3, wherein the angle is between 20° and 70°.

5. The filter system according to claim 3, wherein the angle is between 30° and 60°.

6. The filter system according to claim 1, wherein the sensor socket is arranged directly on the outlet socket.

7. The filter system according to claim 1, wherein the outlet socket is arranged concentrically relative to the longitudinal axis and the sensor socket is laterally offset relative to the longitudinal axis.

8. The filter system according to claim 1, wherein the sensor socket is arranged in a wall of the outlet socket and is laterally offset relative to an axis of the outlet socket.

9. The filter system according to claim 1, wherein the connection interface is adapted to connect a maintenance indicator or a pressure sensor to the sensor socket.

10. The filter system according to claim 1, wherein the sensor socket is arranged in an extension of the housing provided at a front face of the housing,
wherein the outlet socket is arranged at the front face,
wherein the extension extends radially outside of the outlet socket and extends in an axial direction away from the front face.

11. The filter system according to claim 10, wherein the extension is a rib that extends radially, viewed in a direction of the outlet socket,
wherein the rib rises in an outward direction relative to the front face.

12. The filter system according to claim 11, wherein a connection channel of the sensor socket extends within the rib.

* * * * *